United States Patent [19]
Coté

[11] 3,980,877
[45] Sept. 14, 1976

[54] PHOTOFLASH ARRAY WITH DISCHARGE PATH FOR ELECTROSTATICALLY CHARGED PERSON

[75] Inventor: Paul T. Coté, Cleveland Heights, Ohio

[73] Assignee: General Electric Company, Schenectady, N.Y.

[22] Filed: Oct. 1, 1975

[21] Appl. No.: 618,595

[52] U.S. Cl. ............................................. 240/1.3
[51] Int. Cl.$^2$ ......................................... G03B 15/02
[58] Field of Search............ 240/1.3, 103 R; 431/93, 431/95 R, 95 A

[56] References Cited
UNITED STATES PATENTS

| | | | |
|---|---|---|---|
| 3,612,850 | 10/1971 | Nijland et al. ........................ | 240/1.3 |
| 3,894,226 | 7/1975 | Hanson ................................. | 240/1.3 |
| 3,935,442 | 1/1976 | Hanson ................................. | 240/1.3 |
| 3,941,992 | 3/1976 | Blount et al. ................... | 431/95 A X |

*Primary Examiner*—George H. Miller, Jr.
*Attorney, Agent, or Firm*—Norman C. Fulmer; Lawrence R. Kempton; Frank L. Neuhauser

[57] ABSTRACT

A multiple flash lamp array having a plastic housing provided with one or more openings through the housing wall adjacent to an electrical ground part of circuitry contained in the array, to provide a discharge path for an electrostatically charged person or object touching the array. This reduces the possibility of accidental flashing of lamps by electrostatic charges.

7 Claims, 6 Drawing Figures

PHOTOFLASH ARRAY WITH DISCHARGE PATH FOR ELECTROSTATICALLY CHARGED PERSON

CROSS-REFERENCES TO RELATED APPLICATIONS

Ser. No. 488,671, filed Mar. 6, 1974, Kurt H. Weber, "Multiple Flash Lamp Unit", assigned the same as this invention.

Ser. No. 485,459, filed July 3, 1974, Richard Blount, "Multiple Flash Lamp Unit", assigned the same as this invention.

Ser. No. 485,422, filed July 3, 1974, Paul T. Coté, "Multiple Flash Lamp Unit", assigned the same as this invention.

Ser. No. 485,460, filed July 3, 1974, Paul T. Coté, "Protective Terminal for Multiple Flash Lamp Unit", assigned the same as this invention.

Ser. No. 499,316, filed Aug. 21, 1974, Paul T. Coté, "Connector for Photoflash Array", assigned the same as this invention.

Ser. No. 508,334, filed Sept. 23, 1974, Richard Blount, "Photoflash Array Construction", assigned the same as this invention.

Ser. No. 509,410, James M. Hanson, filed Sept. 26, 1974, "Photoflash Lamp Array Having Electrically Connected Reflector", assigned the same as this invention.

Ser. No. 510,362, filed Sept. 30, 1974, Richard Blount, Paul T. Coté, and Edward C. Zukowski, "Flash Array Having Shielded Switching Circuit", assigned the same as this invention.

BACKGROUND OF THE INVENTION

The invention is in the field of multiple photoflash lamp units, such as planar arrays.

U.S. Pat. No. 3,894,226 to James M. Hanson describes a planar photoflash array in which flash lamps are connected to a circuit board containing thereon radiation-sensitive switching circuitry for sequentially flashing the lamps. An electrically conductive reflector unit is positioned between the lamps and the circuit board. The lamps, circuit board, and reflector unit are enclosed in a plastic housing, and the array is provided with connector means for connecting it to a camera or other device for applying firing voltage pulses to the array.

A flash array of the type just described, which is available in stores and is called "FlipFlash", utilizes so-called high voltage lamps which are flashed by high voltage pulses of a few thousand volts, at low energy, such as can be produced by stressing a piezoelectric element contained in a camera or flash adapter. Since persons and objects can become electrostatically charged to several thousand volts (at low energy), especially in dry weather, there could be a problem of lamps accidentally flashing due to electrostatic charge when the array is handled or touched, by a charged person or object, in the vicinity of a lamp or certain parts of the sequencing circuit. This is due to the electrostatic discharge being coupled to or passing through the primers in one or more of the lamps, the primers constituting chemical material for igniting the lamps in response to a suitable voltage.

Some of the above-referenced patent applications disclose techniques for reducing the likelihood of accidental electrostatic flashing of the lamps, including an electrically conductive reflector unit connected to electrical ground of the circuit, and additional electrical shielding means, and circuitry arrangements and connections.

SUMMARY OF THE INVENTION

Objects of the invention are to provide an improved flash lamp array having reduced tendency of accidental flashing of lamps by electrostatic charges.

The invention comprises, briefly and in a preferred embodiment, a flash lamp array having a housing of electrically insulating material and containing flash lamps and electrical circuitry including electrical ground, and one or more openings through the wall of the housing adjacent to said electrical ground in order to provide a preferential discharge path for an electrostatic charge, thus reducing the possibility of accidental flashing of the lamps by the electrostatic discharge. The aforesaid electrical ground may be a conductive reflector unit, circuit runs or connectors, or conductive members such as eyelets or the like. The aforesaid openings through the housing wall may contain or be covered with metal or other electrically conductive material to seal the openings.

The above-mentioned Hanson patent shows and describes interlocking members 38 molded integrally with the plastic back housing member 37 for locking the back housing member 37 with the plastic front housing member in final assembly. The interlocking members 38 are shown to be in the form of latch tabs projecting from near the side edges of the back member 37 for engaging the inner side edges of the front housing member 36. The drawing also shows openings through the back member 37 adjacent to the latch tabs 38, these openings having been formed by the design of the mold for making the back member 37 in order that the mold could integrally form the latch tabs with the rest of the back member and provide them with lateral latch ribs near their ends as shown in detail in the second above-referenced Blount patent application.

The present invention came about in the following manner. The latch-tab openings of several FlipFlash arrays were covered with tape so as to simulate a proposed change to a new housing design not having any latch-tab openings. In performing tests for electrostatic flashing, by applying high voltage probes to the array housings, it was discovered that the arrays having covered-over latch-tab openings had a greater tendency toward flashing of lamps as compared with similar tests on arrays not having the openings covered. It was observed that, with the test probes in certain positions, the discharge would follow a path along the back surface of the housing and enter a latch-tab opening, and this did not occur on arrays having covered openings. This led to the deduction that the discharge, upon passing through an opening, terminated at the nearby edge of the electrically grounded reflector unit, and the present inventive concept arose.

DESCRIPTION OF THE PREFERRED EMBODIMENT

Figure 6:
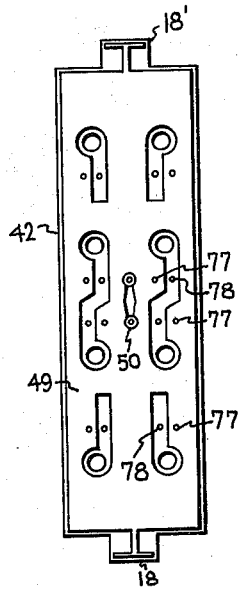
FIG. 6 is a rear view of a circuit board in the array.
Figure 1:
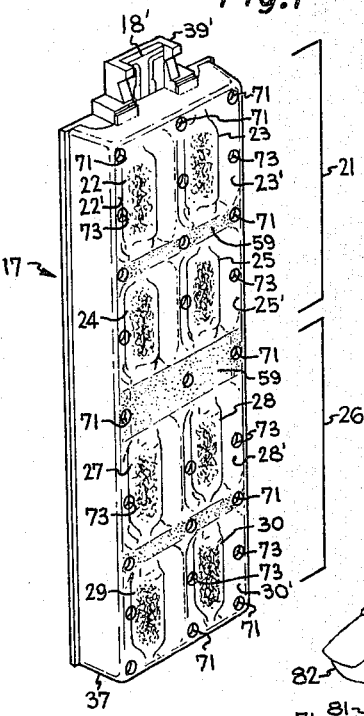
FIG. 1 is a perspective view of a multiple flash lamp array in accordance with a preferred embodiment of the invention.

A multiple flash lamp unit 17 of the planar array type and containing a plurality of electrically fired flash lamps is provided with a plug-in connector tab 18 at the lower side or end thereof, adapted to fit into a socket of a camera or flash adapter as shown and described in the above-referenced patent applications. The lamp array 17 is provided with a second plug-in connector tab 18' at the top side or end thereof, whereby the array 17 is adapted to be attached to the camera socket in either of two orientations, i.e., with either the tab 18 or the tab 18' plugged into the socket. The array 17 is provided with an upper group 21 of flash lamps 22, 23, 24, and 25, and a lower group 26 of flash lamps 27, 28, 29, and 30, the lamps being arranged in a planar configuration. The lamps may be a high voltage type as disclosed in U.S. Pat. No. 3,884,615 to John C. Sobieski. Reflectors 22', etc., are disposed behind the respective flash lamps, so that as each is flashed, its light is projected forwardly of the array 17. The lamps are arranged and connected so that when the array is connected to a camera by the connector 18, only the upper group 21 of lamps will be flashed, and when the array is turned end for end and connected to the camera by the other connector 18', only the then upper group 26 of lamps will be flashed. By this arrangement, only lamps relatively far from the lens axis are flashable, thus reducing the undesirable red-eye effect, as is more fully described in the above-referenced patent applications.

Figures 3, 4:
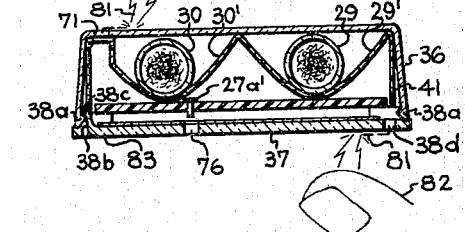
FIG. 3 is a sectional view taken on the line 3—3 of FIG. 2.
FIG. 4 is a sectional view of a portion of the array housing showing a modification of the invention.
Figure 5:
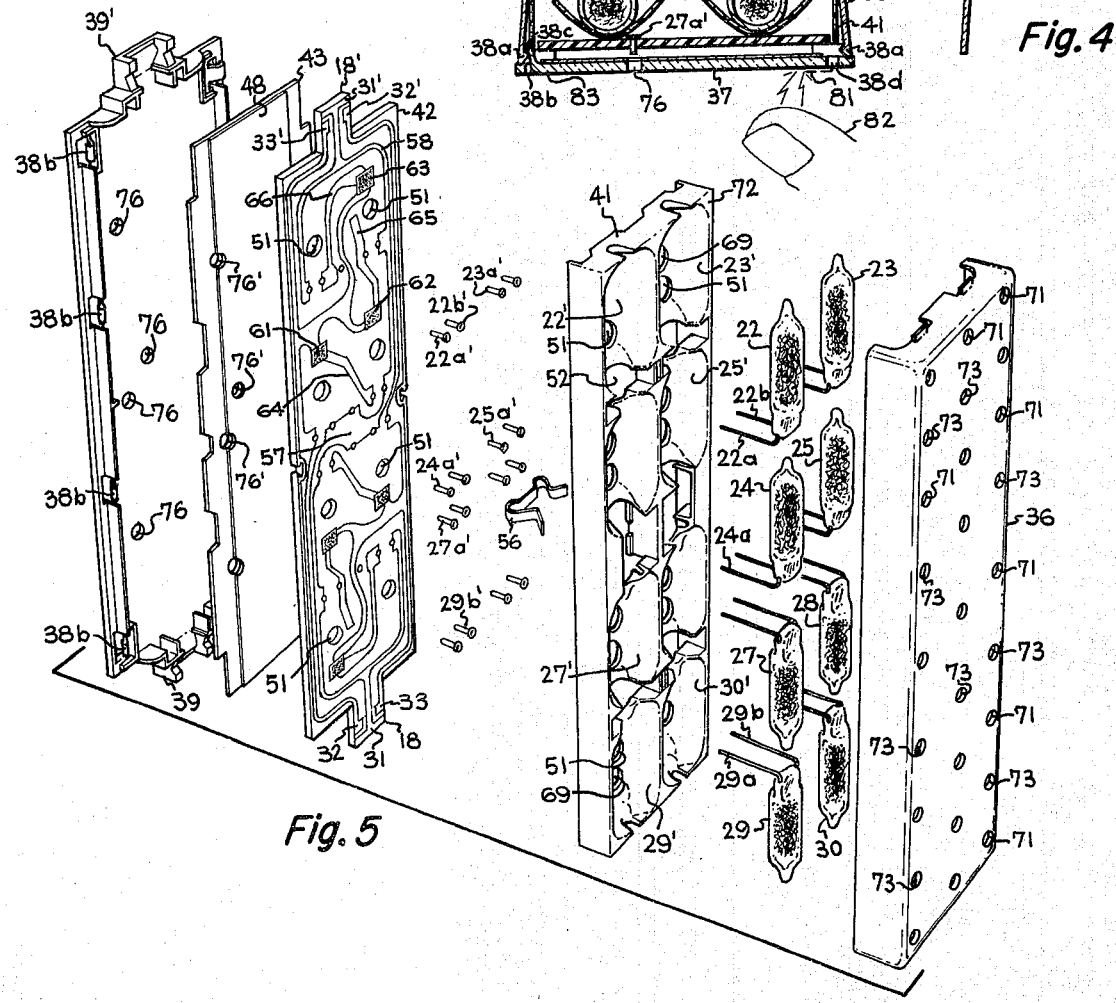
FIG. 5 is an exploded view of the array of FIG. 1 showing the internal parts.

The construction of the array shown in the drawing comprises front and back housing members 36 and 37, which preferably are made of plastic and are provided with interlocking members 38 which can be molded integrally with the housing members and which lock the housing members together in final assembly to form a unitary flash array structure. FIG. 3 shows an interlocking member 38a carried at the rear of the side of the front housing member 36 interlocked with an interlocking member 38b of the back housing member 37. The member 38b is in the form of a latch tab having a transverse latching rib 38c molded integrally with the back housing member 37 by means of a projection of the mold which leaves an opening 38d through the back member 37 adjacent to the latch tab 38b. In the preferred embodiment shown, the front housing member 36 is a rectangular concavity and the back housing member 37 is substantially flat and includes integral extensions 39 and 39' at the ends thereof which partly surround and protect the connector tabs 18 and 18' and also function to facilitate mechanical attachment to the camera socket. Sandwiched between the front and back housing members 36 and 37, in the order named, are the flash lamps 22, etc., a unitary reflector member 41 (preferably of aluminum-coated plastic) shaped to provide the individual reflectors 22', etc., a printed circuit board 42 provided with integral connector tabs 18 and 18', and an indicia sheet 43 which may be provided with instructions, information 44, trademarks 46, and other indicia such as flash indicators 47 located behind the respective lamps and which change color or otherwise change in appearance due to heat and/or light radiation from a flashing lamp, thus indicating at a glance which of the lamps have been flashed and not flashed.

The indicia sheet 43 may be of paper or thin cardboard and provided with openings where the flash indicators 47 are desired, and flash indicator material 48, such as a sheet-like heat-sensitive plastic material, for example diaxially oriented polypropylene, which shrinks or melts when subjected to heat or radiant energy from an adjacent flashing lamp thus effectively changing the appearance or color of the openings in the indicia sheet 43. For example, the plastic material can be colored green on its back side by ink or other suitable means, and the green disappears and the opening becomes a different color (dark, for example) when the plastic shrinks or melts away due to heat from an adjacent flashing lamp. The front of the plastic (toward the lamps) should be coated with dark ink so as to absorb heat more readily. A single flash indicator sheet 48 may be arranged over all of the flash indicator openings. Openings 51 are provided through the reflector unit 41 and the circuit board 42 to facilitate radiation from flashing lamps reaching the flash indicators 47. The rear housing member 37 is transparent (either of clear material or provided with window openings) to permit viewing of the indicia on the indicia sheet 43. The front housing member 36 is transparent at least in front of the lamps 22, etc., to permit light from flashing lamps to emerge frontwardly of the array, and may be tinted to alter the color of light from the flash lamps.

The height and width of the rectangular array are substantially greater than its thickness, and the heights and widths of the reflector member 41 and circuit board 42 are substantially the same as the interior height and width of the housing member 36 to facilitate holding the parts in place.

The tab 18, which is integral with the circuit board 42, is provided with a pair of electrical terminals 31 and 32, and similarly the tab 18' is provided with a pair of terminals 31' and 32', for contacting terminals of a camera socket for applying flash actuation signals such as firing voltage pulses to the array. Each tab is provided with a third terminal 33 and 33', respectively, which functions to electrically short the circuitry of the inactive lower group of lamps when the array is plugged into a socket, as is described in the first above-referenced Blount patent application. The terminals 31 and 31' are shown as having a lateral "T-bar" configuration for temporarily shorting the socket terminals while the array is being plugged in, to discharge any residual voltage charge in the firing pulse source and also to reduce the likelihood of lamps being accidentally flashed by electrostatic voltage when the array is handled, as is disclosed in the above-referenced Coté patent application Ser. No. 485,460. A metal shield 49 covers a large area of the back of the circuit board (FIG. 6) and is electrically grounded to the circuit area 57 at the front of the board by means of eyelets 50 passing through the board.

The circuit board 42 has a "printed circuit" thereon, as will be described, for causing sequential flashing of the lamps by firing voltage pulses applied to the terminals 31, 32 or 31', 32'. The top and bottom halves of the printed circuitry preferably are reverse mirror images of each other. The lead wires 22a, 22b, etc., of the lamps 22, etc., may be attached to the circuit board 42 in various ways, such as by means of metal eyelets 22a', 22b', etc., placed through openings in the board. The lead wires 22a, 22b, etc., pass through openings 52 in the reflector member 41 and into or through the respective pairs of eyelets 22a', 22b', etc., and the ends of the eyelets are crimped or bent to hold the lead wires and make electrical contact thereto and also to hold the eyelets in place with their heads in electrical contact with the circuit of the circuit board. A metal clip 56 is clipped onto the reflector member 41, which is made of metal or metal-coated plastic, and the rear of the clip 56 rests against an area 57 of an electrical ground circuit run 58 on the board and which includes the terminals 31 and 31' and which makes contact with one of the connector eyelets 22a' or 22b', etc., for each of the lamps 22, etc.

Areas 59 on the transparent front housing member 36 may be made opaque or partly opaque, such as by making the surface roughened at these areas, to fully or partly conceal the lamp lead-in wires 22a, 22b, etc., and/or the lower portions of the lamps, for improved appearance of the array.

The circuit board terminal 32 is part of a conductor run that is electrically connected to lead-in wire 24a of lamp 24 at the eyelet 24a' and terminates at radiation switches 61, 62, and 63 respectively positioned near lamps 24, 25, and 23. A circuit board conductor run 64 is connected electrically to the remaining lead wire of flash lamp 25 at eyelet 25a' and terminates at the radiation switch 61. A circuit board conductor run 65 is connected to the remaining lead-in wire of flash lamp 23 at eyelet 23a' and terminates at the radiation switch 62. Similarly, a circuit board conductor run 66 is connected to the remaining lead-in wire of flash lamp 22 at eyelet 22b' and terminates at radiation switch 63.

Figure 2:
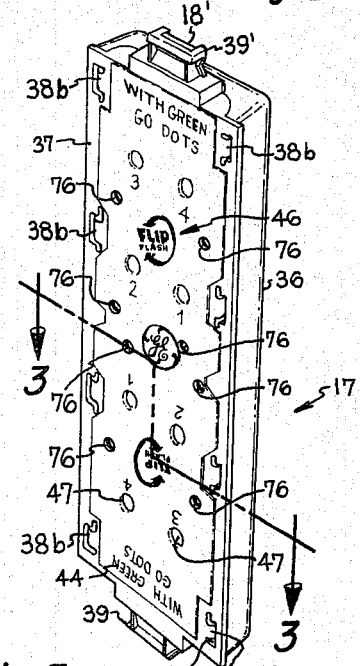
FIG. 2 is a perspective view of the back of the array.

The radiation switches 61, 62, and 63 are respectively in contact with and bridge across the circuit runs that are connected to them. The material for the radiation switches may be suitable material initially having an open circuit or high resistance, the resistance thereof becoming zero or a low value when the material receives radiation in the form of heat and/or light from a respective adjacent lamp, upon the lamp being flashed. For this purpose, each of the radiation switches is respectively positioned behind and near to a flash lamp 24, 25, 23. Windows in the form of transparent sections or openings 69 may be provided in the reflector in front of the switches as shown in FIG. 2 to facilitate radiation transfer. A suitable material for the radiation switches is silver oxide dispersed in a binder such as polyvinyl resin. Each of these radiation switches, upon receiving heat and/or light radiation from the adjacent lamp when it is flashed, changes from an open circuit or high resistance to a closed circuit or low resistance between its switch terminals on the circuit board.

As has been explained, the lower portion of the circuit board contains a substantially reverse mirror image of the same circuit shown in the upper part of the circuit board, and therefore will not be described in detail. It will be noted that the circuit runs from the plugged-in terminals 31 and 32 at the lower part of the circuit board extend upwardly so as to activate the circuitry in the upper half of the circuit board. Similarly, when the unit is turned around and tab 18' is plugged into a socket, the circuit board terminals 31' and 32' will be connected to and activate the lamps which then will be in the upper half of the circuit board, and hence in the upper half of the flash unit 17. This accomplishes, as has been stated, the desirable characteristic whereby only the group of lamps relatively farthest away from the lens axis will be flashed, thereby reducing or eliminating the undesirable red-eye effect.

The circuit on the circuit board 42 functions as follows. Assuming that none of the four lamps in the upper half of the unit 17 have been flashed, upon occurrence of a first firing pulse applied across the terminals 31, 32, this pulse will be directly applied to the lead-in wires of the first-connected flash lamp 24, whereupon the lamp 24 flashes and becomes an open circuit between its lead-in wires. Heat and/or light radiation from the flashing first lamp 24 causes the adjacent radiation switch 61 to become a closed circuit (or a low value of resistance), thereby connecting the circuit board terminal 32 electrically to the lead-in wire of the second lamp 25 at eyelet 25a'. By the time this occurs, the firing pulse has diminished to a value insufficient to cause the second lamp 25 to flash. When the next firing pulse occurs, it is applied to the lead-in wires of the second lamp 25, via the now closed radiation switch 61, whereupon the second lamp 25 flashes, thereby causing radiation switch 62 to assume zero or low resistance, and the second lamp 25 now has an open circuit or high resistance between its lead-in wires. When the next firing pulse occurs, it is applied via now closed radiation switch 62 to the third lamp 23, thereby firing the lamp which becomes an open circuit, and the radiation from it causes the radiation switch 63 to become essentially a closed circuit across its terminals. Thus, the next firing pulse will be applied, via now closed radiation switch 63, to the lead-in wires of the fourth flash lamp 22, thereupon causing the lamp to flash. Since this lamp is the last lamp in the active circuit, it does not matter whether its lead-in wires are an open or closed circuit after flashing. Additional flash lamps, radiation switches, and electrical conductors can be employed, if desired, using the just described principles. When the flash unit is turned around and the other connector tab 18' is attached to the camera socket, the group of lamps that then become uppermost and relatively farthest away from the lens axis will be in an active circuit and will be flashed in the same manner as has been described. In a preferred embodiment, the lamps 22, etc., are high voltage types, requiring about 2000 volts at low current for flashing, and they are fired by impacting or stressing a piezoelectric element in the camera.

In accordance with the invention, openings are provided through the wall of the housing in the vicinity of electrical ground points of the circuitry in the array, to provide a preferential path for electrostatic discharges which reduces the possibility of accidental flashing of lamps. Suitable electrical ground parts of the circuitry are the reflector unit, and electrical ground circuit runs on the circuit board, and flash lamp lead-in wires and their connector eyelets which are connected to electrical ground. The aforesaid openings increase the possibility that an electrostatic discharge to the array will reach electrical ground in the array and go into surrounding space or to earth ground and thus will not pass to or through primers of the lamps. The openings preferably are provided through the front and/or back of the array housing, and preferably are at or near circuit ground points which are near sensitive parts of the array such as the lamps and the "hot" circuit runs that are connected to the non-grounded lead-in wires of the lamps, either directly or via radiation switches. A plurality of openings 71 are shown through the front housing member 36 at points at or near areas where the electrically grounded reflector unit is against or adjacent to the front housing member. The openings may be arranged in a matrix, as shown, to provide electrostatic discharge paths to the reflector unit over a considerable area of the front surface 72 of the array. Experiments with a test probe at 20,000 volts (a person can become charged up to 20,000 volts or more in dry weather), moved over the front surface of the array, have indicated that the discharge prefers a path through an opening 71 (and to the grounded reflector unit 41) when the probe is within about one-fourth of an inch from the edge of an opening 71. Thus, there is a "safe" area of about ½ inch or more diameter around each opening. The exact diameter of these safe areas is believed to vary with humidity and other conditions such as the wall thickness of the housing. In the arrays tested, the housing walls were 0.030-inch thick and made of polystyrene plastic.

Additional openings 73 may be provided, also in the form of a matrix, to further increase the amount of "safe" area on the front of the array. The openings 73 are beneficially located near the flash lamps so that they tend to draw discharges (similarly to a lightning rod) when the test probe (or a charged person or object) is placed on or near the front of the array in the vicinity of a lamp. Ideally, enough openings 71, 73 are provided to render the entire front area of the array "safe", i.e., so that from any point on the front surface, a discharge will prefer going through an opening and to the reflector unit rather than through the housing wall (either directly or capacitively) and to a lamp. However, even a few openings will provide some beneficial effect.

The openings may be very small, so as to not be readily visible, or can be fairly large, for example, one-eighth of an inch diameter, to provide a larger "safe" area around them. The openings may be sealed if desired by electrically conductive material such as metal positioned in and/or over the openings as indicated by the rivet 74 in FIG. 4. A conductor 74 extending through an opening will increase the diameter of the "safe" area therearound by shortening the electrical path through the opening. The openings may be circular or any other desired shape.

Openings 76 may be provided through the wall of the back housing member 37 at points near an electrical ground of the array circuit, for the same purpose as the previously described openings 71, 73. In the array shown, each lamp has an electrically grounded lead-in wire at an opening 77 through the circuit board 42 at the area covered by the metal shield 49 (FIG. 6), and a "hot" lead-in wire at an opening 78 through the board 42 at an area not covered by the metal shield 49. As has been explained above, the lamp lead-in wires are connected to the circuit board by means of eyelets 22a', etc. When a charged person or object touches or is near the back of the array in the vicinity of one of the "hot" lamp wires or eyelets at a circuit board opening 78, there would be a possibility of a discharge passing (either directly or capacitively) through the housing wall and to this "hot" part of the circuit thereby causing a lamp to flash. However, each of the discharge-path openings 76 is near to one of these "hot" parts of the back of the circuit board, so as to create a "safe" area which covers or extends near to a "hot" region. Openings 76' are provided through the indicia sheet 48 in alignment with the openings 76 to facilitate discharge to electrical ground. The mold-formed openings 38d, although relatively far from the "hot" regions, have been found to cause a reduction of accidental flashing of lamps by electrostatic discharges, as has been described above. The openings 76 and 38d in the back wall of the housing can be sealed with electrically conducting material as has been described with reference to FIG. 4.

FIG. 3 shows some representative discharge paths 81 which can occur when a finger 82 of an electrostatically charged person is brought near to the array in the vicinity of a discharge opening, such as the openings 71, 73, 76, and 38d.

Further in accordance with the invention, the electrically grounded eyelets 27a', etc., extend from the back of the circuit board 42 and toward the back 83 of the array, and the discharge openings 76 at the back of the array are located near or in alignment with the respective electrically grounded connector eyelets, such as eyelet 27a' shown in FIG. 3, thus shortening the electrical discharge path from the back surface of the array and increasing the diameter of the "safe" area around each opening. Instead of or in addition to the connector eyelets 27a', etc., extending toward the back of the array, the electrically grounded lead-in wires of the flash lamps can be shaped to extend toward or through the openings 76 in the back wall of the array.

It has been found that the invention achieves its objective of providing a flash array construction that has a reduced possibility of accidental lamp flashing from electrostatic discharges. The invention is particularly useful in flash arrays employing high voltage lamps which are flashed by a high voltage of low energy, such as 100 volts or more at less than 1 millijoule, because such lamps can become accidentally flashed by electrostatic discharges.

While preferred embodiments of the invention have been shown and described, various other embodiments and modifications thereof will become apparent to persons skilled in the art, and will fall within the scope of the invention as defined in the following claims.

What I claim as new and desire to secure by Letters Patent of the United States is:

1. A flash lamp array comprising a hollow walled housing containing flash lamps and circuitry including electrical ground, and one or more openings through the wall of said housing adjacent to said electrical ground in order to provide a discharge path for electrostatic charges to said electrical ground and reduce the possibility of accidental flashing of lamps by said electrostatic charges.

2. An array as claimed in claim 1, in which one or more of said openings are sealed with electrically conducting material.

3. An array as claimed in claim 1, in which said electrical ground includes a conductive reflector unit positioned to reflect light from said lamps when flashed, at least a portion of said reflector unit being positioned adjacent to the inner surface of said housing wall, said one or more openings being positioned at said portion of the reflector unit.

4. An array as claimed in claim 3, in which said portion of the reflector unit and said openings are arranged in the form of a matrix distributed on a surface of said housing.

5. An array as claimed in claim 1, including a circuit board contained within said housing and provided with a conductor thereon included in said electrical ground and positioned adjacent to said housing wall, said one or more openings through the housing wall being positioned adjacent to said conductor.

6. An array as claimed in claim 5, in which said conductor and said openings are arranged in the form of a matrix distributed on a surface of said housing.

7. An array as claimed in claim 5, in which each of said lamps is provided with a pair of lead-in wires, a plurality of pairs of connector means for respectively connecting said pairs of lead-in wires to said circuit board, said connector means being adjacent to said housing wall, one connector means of each said pair thereof being connected to "hot" electrical circuitry of said circuit board and the other connector means of each said pair thereof constituting said electrical ground, said openings through the housing wall being respectively positioned substantially in alignment over said electrical ground connector means.

* * * * *